May 31, 1960 R. A. KRAFT 2,938,951
TELEVISION RECEIVER
Filed Dec. 12, 1955
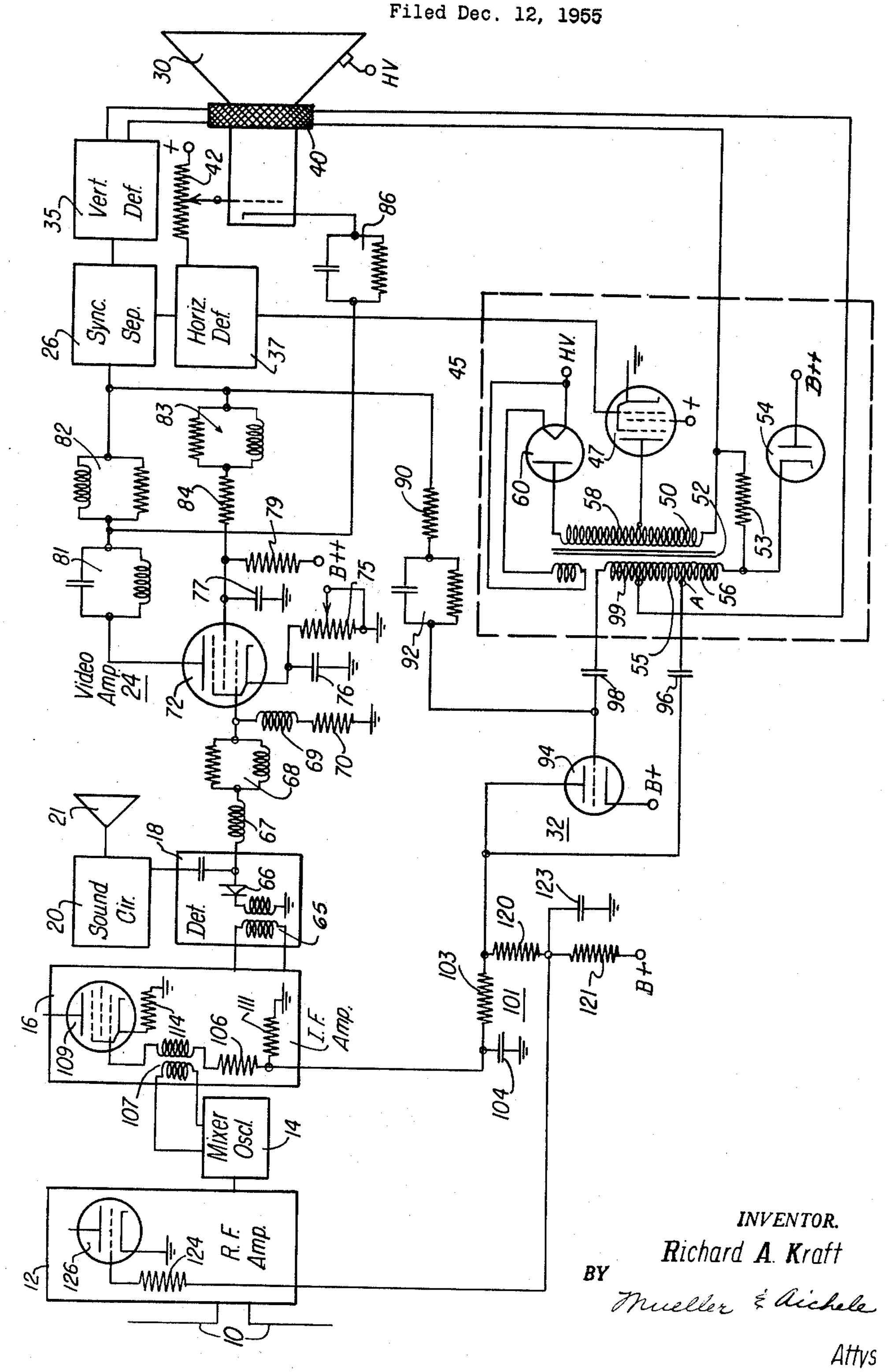
INVENTOR.
Richard A. Kraft
BY Mueller & Aichele
Attys United States Patent Office 2,938,951
Patented May 31, 1960

2,938,951

TELEVISION RECEIVER

Richard A. Kraft, Elmhurst, Ill., assignor to Motorola, Inc., Chicago, Ill., a corporation of Illinois Filed Dec. 12, 1955, Ser. No. 552,308

2 Claims. (Cl. 178—7.5)

This invention relates to television receivers and more particularly to automatic gain control systems for such receivers.

It is common to include a gain control circuit in television receivers in order to maintain the level of the signal applied to the picture tube substantially constant thus holding the contrast of the picture at a chosen level. Various types of such circuits have been proposed, among them being the keyed or gated type wherein the synchronizing component of the television signal is applied to a circuit which "samples" the amplitude thereof and raises or lowers the bias on amplifier tubes in the receiver in response to increase or decrease in the amplitude of this component. Such a system is made responsive only to the synchronizing component of the received signal by rendering a gain control tube conductive through application thereto of a portion of the horizontal deflection signal, thus controlling gain of the receiver according to only part of the received television signal so that some noise pulses and the like may not affect the system.

Many gated automatic gain control systems using pentode tubes have given satisfactory results, although use of the less expensive triode tube has not been altogether successful because such tubes are less stable and more susceptible to change in operating characteristics as the applied operating potentials vary during use of the receiver.

It is an object of this invention to provide an improved automatic gain control system using an inexpensive triode vacuum tube which operates in a stable, reliable manner.

Another object is to provide a simple, low cost, gated automatic gain control system for a television receiver.

Still another object is to provide a keyed or gated automatic gain control system which compensates for variations in certain circuit parameters so that more uniform operation is obtained during use.

A feature of the invention is the provision of a triode gated automatic gain control tube in a television receiver with the anode thereof energized from a tap on the secondary of the horizontal output transformer and the grid thereof coupled to an additional winding portion series coupled with the secondary winding to supply a neutralizing signal for the triode tube thereby to permit the use of a simple triode in place of the more expensive multigrid tubes.

Another feature of the invention is the provision of a triode tube used in a gated automatic gain control circuit described in the preceding paragraph, the control grid of which tube is direct-current coupled to the output of the video amplifier in the receiver to derive signals of relatively large value therefrom and the anode of which is pulsed by a signal of substantial voltage at the horizontal deflection frequency in order to apply operating potentials to the tube producing improved operation thereof.

Further objects, features and the attending advantages of the invention will be apparent upon consideration of the following description when taken in conjunction with the accompanying drawing in which the single figure is a schematic diagram of a television receiver incorporating the invention.

In practicing the invention, there is provided a triode vacuum tube used in a gated automatic gain control (AGC) circuit of a television receiver. The grid of this tube is direct-current coupled to the output, or anode, of the video amplifier tube in the receiver so that the signal appearing at this grid, including the synchronizing pulses, is at a comparatively high level. Accordingly, the gain of the receiver is regulated directly by the signal as applied to the picture tube from the video amplifier. The anode of the triode tube is coupled to a tap on the horizontal output transformer at which appears a voltage pulse, which pulse drives this anode positive with respect to the cathode and causes conduction of the tube when synchronizing pulses are applied to the grid. An additional winding portion on the horizontal output transformer is connected to the grid of the triode to apply a signal to the tube for neutralizing the signal intercoupled between anode and grid due to interelectrode capacitance. The anode of the triode is also coupled through a resistance-capacitance (RC) filter to the radio frequency and intermediate frequency amplifier stages in the receiver in order to control the gain of these stages in accordance with conduction of the tube as regulated by the synchronizing pulses.

Referring to the figure there is shown a television receiver system including an antenna 10 coupled to a radio frequency amplifier 12 which may include any number of amplifying stages. The amplifier 12 is coupled to a mixer oscillator circuit 14 which heterodynes a received signal with a signal from the local oscillator to provide a signal of intermediate frequency. The signal of intermediate frequency is applied to intermediate frequency amplifier 16 which further selects and increases the level of the signal after which it is applied to a detector circuit 18. The circuit 18 is connected to a sound utilization circuit 20 which applies demodulated audio of the received television signal to loudspeaker 21. Detector circuit 18 is also connected to the video amplifier 24 which amplifies the video portions of the received television signal as well as the synchronizing components of this signal. The synchronizing components are then applied to the synchronizing signal separator 26 and the video components of the signal are applied to the cathode of the cathode ray picture tube 30. Video amplifier 24 is also coupled to the automatic gain control system 32 which regulates the gain of the RF amplifier 12 and the IF amplifier 16.

The synchronizing signal separator 26 supplies a signal to control the vertical deflection circuit 35 and the horizontal deflection circuit 37. Deflection circuit 35 is coupled to the deflection yoke 40 in order that suitable field scanning of the electron beam may be obtained. Horizontal deflection circuit 37 is connected through variable resistor 42 to a grid of cathode ray tube 30 in order to assist cutoff of the tube between horizontal scanning lines of the beam. Resistor 42 also applies a direct-current potential to the grid of tube 30 for brightness control.

The horizontal deflection circuit 37 is connected to a horizontal output circuit 45 which includes a horizontal output tube 47, the conduction of which is controlled by signals from circuit 37. Output tube 47 conducts through a winding portion 50 of horizontal output transformer 52 and through resistor 53 and damper tube 54. Periodic conduction of tube 47 according to application thereto of the horizontal synchronizing components of the received television signal thus provides horizontal deflection signals across winding portions 55 and 56 of output transformer 52. Winding portions 55 and 56 are coupled to the deflection yoke 40 in order to effect horizontal scanning of the cathode ray beam. Output transformer 52 also includes a winding portion 58 which is connected to high voltage rectifier 60 to supply a high potential for the anode of cathode ray tube 30. The television receiver described generally thus far is considered to be understood in the art and one which operates according to principals known by those skilled in the television field.

Considering now portions of the receiver in greater detail, it may be noted that detector 18 includes a transformer 65 which has a secondary winding which is series-coupled with diode 66, choke 67, parallel connected resistor-choke 68, choke 69 and resistor 70. The interconnection of the secondary of transformer 65 and resistor 70 is grounded. The detected video signal is applied to the control grid of tube 72 from the top of choke 69. The cathode of tube 72 is grounded through variable resistor 75 which is bypassed for the intermediate frequency signals by capacitor 76. Variation of resistor 75 adjusts the degeneration of tube 72 and accordingly provides control of the amplification of this tube and permits contrast control of the picture reproduced by cathode ray tube 30. Screen grid bypass for tube 72 is furnished by capacitor 77 and a positive operating potential is obtained for the screen grid through resistor 79. The anode of tube 72 is also direct-current coupled to resistor 79 through an intercarrier sound trap 81, parallel connected peaking coil-resistor network 82, parallel connected peaking coil-resistor network 83, and resistor 84. The junction of trap 81 and network 82 is coupled by way of parallel connected resistor-capacitor biasing network 86 to the cathode of the tube 30 to supply the video signal to this tube. The inner connection of networks 82, 83 is joined to the synchronizing signal separator 26 to supply synchronizing components of the television signal thereto. By way of characterizing the video amplifier circuit and associated elements, it may be noted that tube 72 is direct-current coupled to the detector 18 and that the output of this tube is also direct-current coupled to the cathode of the cathode ray tube 30.

At the junction of networks 82, 83, there is also a connection through resistor 90 and parallel connected resistor-capacitor network 92 to the control grid of the triode tube 94 in the AGC circuit 32. The cathode of tube 94 is connected to B plus that is a reference potential for circuit 32, and the anode thereof is coupled through capacitor 96 to a tap "A" on horizontal output transformer 52 at which winding portions 55, 56 are interconnected. It may also be noted that the control grid of tube 94 is coupled through capacitor 98 to one end of a winding portion 99 on transformer 52 the other end of which is series connected to the winding portion 55.

During operation of circuit 32, a portion of the horizontal deflection signal that is positive with respect to B plus (the cathode potential of tube 94), is coupled through capacitor 96 to the anode of tube 94 to render the tube conductive at a time when the horizontal synchronizing component of the television signal appears at the output of the video amplifier 24. Detector 18 provides an output such that synchronizing signal components from the amplifier 24 are applied to the grid of tube 94 in a positive direction at the same time that the anode and cathode of this tube are energized to cause conduction thereof. Winding portion 99, which may consist of turns on transformer 52 in addition to those necessary to supply the horizontal deflection signal, (for example, an additional 50 turns), supplies through capacitor 98 a small portion of the horizontal deflection signal which stabilizes the triode tube 94 and balances out any feedback of a signal through the anode grid capacitance of this tube. Accordingly, through this neutralizing system, circuit 32 is made stable and undesirable feedback in the triode tube 94 is prevented.

The anode of tube 94 is also coupled to an RC filtering system 101 including a series-resistor 103 and a storage capacitor 104 coupled to ground. The interconnection of resistor 103 and capacitor 104 is coupled through resistor 106 and the secondary winding of transformer 107 to the control grid of amplifier tube 109 in the IF amplifier 16. A D.C. path to ground is provided for this grid by way of resistor 111 which is connected to the junction fo resistors 103, 106. The cathode of tube 109 is grounded through resistor 114. The anode of tube 94 is also coupled through a series combination of resistors 120 and 121 to a positive potential source and a capacitor 123 is coupled from the interconnection of resistors 120 and 121 to ground. The junction of resistors 120, 121 is also coupled through resistor 124 to the control grid of tube 126 in RF amplifier 12. The cathode of tube 126 is connected directly to ground.

RC system 101 as described provides a small delaying potential on the grid of tube 126 as this grid draws a small amount of current through resistors 121, 124. Then as tube 94 conducts, a negative charge is built up in capacitors 104, 123 thus biasing the control grids of tubes 109 and 126 with a greater charge being needed to bias tube 126. This reduces the gain in the receiver and consequently the level of the signal applied to the control grid of tube 94 so that the overall gain of the receiver is established at a point where tube 94 is just at the threshold of conduction as each synchronizing component is applied to its grid. However, if the level of the synchronizing signals decreases, a lesser charge is held by capacitors 104, 123 thus increasing the gain of the receiver (by providing a less negative bias on tubes 109, 126) to compensate for the decrease in the level of the received signal. A corresponding but opposite action would take place when the level of the received signal increases.

It should be pointed out that as the tubes in any of the stages applying a video signal to the cathode ray tube, including the video amplifier tube 72, decrease in conductive properties due to aging or the like, a smaller signal will be applied to tube 94 thus increasing the gain of the receiver and compensating for this change. Furthermore, with the input to the gain control circuit 32 being supplied from the output of the video amplifier 24, that is, with the signal having considerable amplitude and the energizing potentials also being large, electrode voltage changes will be a comparatively small percentage of applied voltage changes and tube 94 will be comparatively insensitive to such voltage changes on the various electrodes thereof as caused by a change in line voltage supplying power to the set, change in size settings of the receiver, and the like. Accordingly, the lack of sensitivity of the triode 94 to variation in operating potentials applied to this tube together with the simple neutralizing system described previously provide a gated automatic gain control system of good stability and low cost.

I claim:

1. In a television receiver for utilizing a signal including video frequency components and synchronizing components and having signal amplifier means with a gain characteristic adapted to be regulated by application of a bias potential thereto, a detector coupled to the amplifier means, a video amplifier direct current coupled to the detector and providing positive going synchronizing components at an output electrode of an output tube thereof, a cathode ray tube coupled to the output electrode to be driven by the signal at a given level, and a sweep system controlled by the synchronizing components to provide horizontal deflection signals to an associated deflection yoke: the gated automatic gain control system including in combination, a vacuum tube with anode, cathode and grid, with said grid directly preceding said anode, passive direct current coupling means connecting said grid to the output electrode of the output tube in the video amplifier and applying the signal at substantially the given level to said grid for controlling conduction of said vacuum tube thereby, means coupling said cathode to a positive potential, a horizontal output transformer in the sweep system including a winding with a first winding portion coupled to the deflection yoke and in which appears a deflection signal positive with respect to the aforesaid positive potential, said winding including a second winding portion in which a signal negative with respect to the deflection signal is developed, capacitor means coupling said first winding portion to said anode for applying the deflection signal thereto and, together with the synchronizing components at said grid, causing conduction of said vacuum tube, further capacitor means coupling said second winding portion to said grid to provide a neutralizing signal therefor, resistor-capacitor means coupling said anode to a reference point and forming a gain control output circuit effectively in shunt with said first named capacitor means and said first winding portion, and means coupling said gain control output means to the signal amplifier means to apply thereto a bias potential related to the level of the synchronizing components of the signal at the output electrode as said vacuum tube conducts.

2. In a television receiver for utilizing a signal including video frequency components and synchronizing components and having signal amplifier means with a gain characteristic adapted to be regulated by application of a bias potential thereto, a detector coupled to the amplifier means, a video amplifier direct current coupled to the detector and providing positive going synchronizing components at an output electrode of an output tube therefor, means for applying a B+ potential to the anode electrode of such output tube, a cathode ray tube coupled to the output electrode to be driven by the signal at a given level, and a sweep system controlled by the synchronizing components to provide horizontal deflection signals to an associated deflection yoke: the gated automatic gain control system including in combination, a triode vacuum tube with anode, cathode and grid, passive direct current coupling means connecting said grid to the output electrode of the output tube in the video amplifier and applying the signal at substantially the given level to said grid for controlling conduction of said vacuum tube thereby, means coupling said cathode to the B+ potential to establish the same at a reference potential, a horizontal output transformer in the sweep system including a winding with a first winding portion coupled to the deflection yoke and in which appears a deflection signal positive with respect to the aforesaid positive potential, said winding including a second winding portion comprising a continuation of said first winding portion and in which a signal negative with respect to the deflection signal is developed, capacitor means coupling said first winding portion to said anode for applying the deflection signal thereto and, together with the synchronizing components at said grid, causing conduction of said vacuum tube, further capacitor means coupling said second winding portion to said grid to provide a neutralizing signal therefor, resistor-capacitor means coupling said anode to the B+ potential and forming a gain control output circuit effectively in shunt with said first named capacitor means and said first winding portion, and means coupling said gain control output means to the signal amplifier means to apply thereto a bias potential related to the level of the synchronizing components of the signal at the output electrode as said vacuum tube conducts.

References Cited in the file of this patent

UNITED STATES PATENTS 2,636,939 Wissel et al. ------------ Apr. 28, 1953

OTHER REFERENCES

Rider Television Manual, vol. 12, RCA TV, pages 12–16, copyrighted November 18, 1953 (KCS Circuit Schematic Diagram).